(12) United States Patent
Nyberg et al.

(10) Patent No.: US 9,167,013 B2
(45) Date of Patent: Oct. 20, 2015

(54) METHOD AND APPARATUS FOR PRIORITIZING MEDIA WITHIN AN ELECTRONIC CONFERENCE ACCORDING TO UTILIZATION SETTINGS AT RESPECTIVE CONFERENCE PARTICIPANTS

(75) Inventors: Marcus Nyberg, Hägersten (SE); Kristofer Dovstam, Solna (SE); Caroline Hägglund, Stockholm (SE); Cristian Norlin, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 239 days.

(21) Appl. No.: 14/001,911

(22) PCT Filed: Mar. 10, 2011

(86) PCT No.: PCT/IB2011/051022
§ 371 (c)(1),
(2), (4) Date: Aug. 28, 2013

(87) PCT Pub. No.: WO2012/120339
PCT Pub. Date: Sep. 13, 2012

(65) Prior Publication Data
US 2013/0339451 A1    Dec. 19, 2013

(51) Int. Cl.
| | |
|---|---|
| G06F 15/16 | (2006.01) |
| H04L 29/06 | (2006.01) |
| H04L 5/00 | (2006.01) |
| H04M 3/56 | (2006.01) |
| H04L 12/18 | (2006.01) |
| H04N 21/262 | (2011.01) |
| H04N 21/63 | (2011.01) |
| H04L 12/24 | (2006.01) |

(52) U.S. Cl.
CPC ............ *H04L 65/403* (2013.01); *H04L 5/0064* (2013.01); *H04L 12/1827* (2013.01); *H04L 65/4038* (2013.01); *H04M 3/567* (2013.01); *H04N 21/262* (2013.01); *H04N 21/26216* (2013.01); *H04N 21/631* (2013.01); *H04L 12/1886* (2013.01); *H04L 41/0896* (2013.01); *H04M 2250/62* (2013.01); *H04Q 2213/1324* (2013.01); *H04Q 2213/1325* (2013.01); *H04Q 2213/13109* (2013.01)

(58) Field of Classification Search
USPC .......................................... 709/204, 224, 220
See application file for complete search history.

(56) References Cited

U.S. PATENT DOCUMENTS 7,213,050 B1 *  5/2007  Shaffer et ..................... 709/204
7,668,907 B1 *  2/2010  Janakiraman et al. ........ 709/204
(Continued)

OTHER PUBLICATIONS

Shacham, N., et al., "An Algorithm for Optimal Multicast of Miltimedia Streams", 13th Proceedings IEEE Networking for Global Communications., Jun. 12, 1994, pp. 7a.3.1-7a.3.9 (856-864 ), vol. 2, IEEE.

*Primary Examiner* — Philip B Tran
(74) *Attorney, Agent, or Firm* — Coats & Bennett, PLLC (57) ABSTRACT

In one aspect, the teachings herein address the changing network capacity requirements that arise in electronic conferencing systems not hosted in a fully dedicated network using a clever prioritization scheme that is determined in view of which source streams (26) available in the electronic conference are being used by respective conference clients (22) and how they are being used by those clients (22). In one non-limiting example, the electronic conference is a video conference managed by an electronic conferencing server (10) in a host network (20).

22 Claims, 5 Drawing Sheets

(56) References Cited

U.S. PATENT DOCUMENTS

| | | | |
|---|---|---|---|
| 8,249,235 B2* | 8/2012 | Kim et al. | 709/204 |
| 2003/0081112 A1* | 5/2003 | Sheldon et al. | 348/14.09 |
| 2004/0158614 A1* | 8/2004 | Williams | 709/205 |
| 2005/0237931 A1 | 10/2005 | Punj et al. | |
| 2005/0283536 A1* | 12/2005 | Swanson et al. | 709/204 |
| 2008/0226049 A1* | 9/2008 | Kumar et al. | 379/202.01 |

* cited by examiner

METHOD AND APPARATUS FOR PRIORITIZING MEDIA WITHIN AN ELECTRONIC CONFERENCE ACCORDING TO UTILIZATION SETTINGS AT RESPECTIVE CONFERENCE PARTICIPANTS

TECHNICAL FIELD

The present invention generally relates to electronic conferencing, such as video conferencing or other multimedia conferencing, and particularly relates to managing conference bandwidth requirements based on clever prioritization of conferee streams.

BACKGROUND

Electronic conferencing has long held the promise of enhancing collaboration, reducing travel requirements, and generally aiding the convenient and timely conferencing of potentially large work groups. Non-limiting examples of electronic conferencing include video conferencing and web conferencing and it should be noted that electronic conferencing is sometimes referred to as "e-conferencing."

Both private networks, such as the typically closed "enterprise" networks managed by corporate entities, and public networks, such as the various Public Land Mobile Networks (PLMNs) nowadays available, have evolved to a point where high-quality electronic conferencing has become an integral business and research tool. Challenges remain, however, with respect to supporting and managing potentially large electronic conferences within enterprise networks and other networks that act as "host" networks.

Imagine a typical large corporation and its corresponding enterprise network. The corporation may use one or more "conference servers," each acting as conference controller or management hub, and each able to host one or more potentially large electronic conferences. As the central hub for each conference, the conference server requires a certain amount of host network capacity—e.g., for each ongoing conference, the conferencing server requires a given and perhaps dynamically changing amount of the overall bandwidth capacity of the host network.

The aggregate resource "footprint" for a given electronic conference depends on the number of conference participants, referred to herein as "clients," and on the bandwidths of their respective source and conference streams. Here, a "client" is an electronic device participating in the electronic conference. In general, each client contributes a source stream that is received at the conferencing server, and receives a conference stream from the conferencing server. The conference stream sent to a given client generally comprises selected source streams from one or more other clients, possibly with modifications applied by the conferencing server (such as mixing, multiplexing, conversion, reformatting, etc.).

The conference stream sent to any particular client will generally depend on the selections and preferences of that conferee. Two clients having comparable conference settings, capabilities and network connections may receive the same or substantially the same conference stream—e.g., same bitrate or quality, and the same content. On the other hand, two clients with different conference settings, capabilities, or network connections may receive substantially different conference streams. Compare, for example, the conference stream sent to a remote high-definition (HD) video conferencing system having a high bandwidth Internet connection to the host network versus the conference stream sent to a remote mobile phone that has a low resolution display screen and is connected through a cellular communication network that offers limited and changing connection bandwidths and suffers from typical radio link data losses.

SUMMARY

In one aspect, the teachings herein address the changing network capacity requirements that arise in electronic conferencing systems not hosted in a fully dedicated network using a clever prioritization scheme that is determined in view of which source streams available in the electronic conference are being used by respective conference clients (participants) and how they are being used by those clients. In at least one embodiment, these source stream utilizations are used to determine relative priorities among the source streams, and source stream adjustments, such as bandwidth lowering or suspension of source stream transmission, are done advantageously in consideration of such priorities. For example, adjustments are limited to or otherwise initially made to lower-priority streams. By acting on lower-priority source streams, reductions in the amount of host network capacity consumed by a conference can be obtained, while minimizing the impact of such reductions on the quality of the conference experience.

In one non-limiting example, the electronic conference is a video conference. Not every client wants the source video stream from every other client and not every client has the same viewing quality settings or viewing quality capabilities. The viewing quality settings may be customizable at each client—i.e., the user of each client can select viewing window sizes and qualities, and change such settings on the fly. In this advantageous context, the teachings herein manage the capacity requirements of an electronic conference in view of the actual utilizations being made of the conference streams at the respective clients. Such consideration allows the method and apparatus disclosed in example form herein to make "smart" prioritizations when taking action to reduce the capacity requirements of a given electronic conference.

One embodiment presented herein discloses a method of controlling clients in an electronic conference. The method includes receiving source streams at an electronic conferencing server hosting the electronic conference in a host network. Each source stream originates from a respective one among a plurality of clients participating in the electronic conference and it will be understood that the conference stream provided from the conferencing server to any given client comprises source streams from one or more other clients participating in the conference, e.g., which may have been mixed or otherwise combined by the conferencing server, possibly with reformatting or other modifications.

The method includes determining a source stream utilization within the electronic conference for each source stream, based on collecting configuration settings from each client that indicate which source streams are selected for utilization at the client. In other words, a given client may not make use of all available source streams and instead selects only a subset of the available source streams for use at the client. Moreover, the client may apply different utilization settings to each selected source stream. In a video example, a utilization setting determines, for example, the resolution or formatting used for viewing a particular one of the source streams selected at the client for viewing The method thus continues with prioritizing the source streams according to their respective source stream utilizations to determine relative priorities of the source streams and selectively reducing an amount of host network capacity consumed by the electronic conference. Such reduction is based on selecting one or more clients that are originating lower-priority source streams, as determined from the relative priorities, and directing the selected clients to stop sending their respective source streams, or to reduce a bandwidth of their respective source streams. For example, the source stream utilizations reveal that a given client is originating a source stream that is not being utilized by any of the remaining clients, or is being used at a very low utilization level—e.g., the source stream is a video stream being viewed by one or more other clients only at a low resolution.

Correspondingly, in another embodiment an electronic conferencing server is configured to control clients in an electronic conference hosted by the electronic conferencing server. The electronic conferencing server comprises one or more communication interfaces configured to receive source streams through a host network in which the electronic conferencing server operates. Each said source stream originates from a respective one among a plurality of clients participating in the electronic conference.

The electronic conferencing server includes a control circuit that is operatively associated with the one or more communication interfaces and is configured to determine a source stream utilization within the electronic conference for each source stream, based on collecting configuration settings from each client that indicate which source streams are selected for utilization at the client. The control circuit is further configured to prioritize the source streams according to their respective source stream utilizations to determine relative priorities of the source streams, and to selectively reduce an amount of host network capacity consumed by the electronic conference by selecting one or more clients that are originating lower-priority source streams, as determined from the relative priorities. These selected clients are directed to stop sending their respective source streams, or to reduce a bandwidth of their respective source streams. The reduction in conference bandwidth requirements ideally corresponds to the "weightings" represented in the priority scheme determined by the conferencing server.

Of course, the teachings herein are not limited to the above brief summary of features and advantages. Those skilled in the art will recognize other features and advantages from the following detailed discussion of example embodiments, and from the accompanying illustrations.

DETAILED DESCRIPTION

Figure 1:
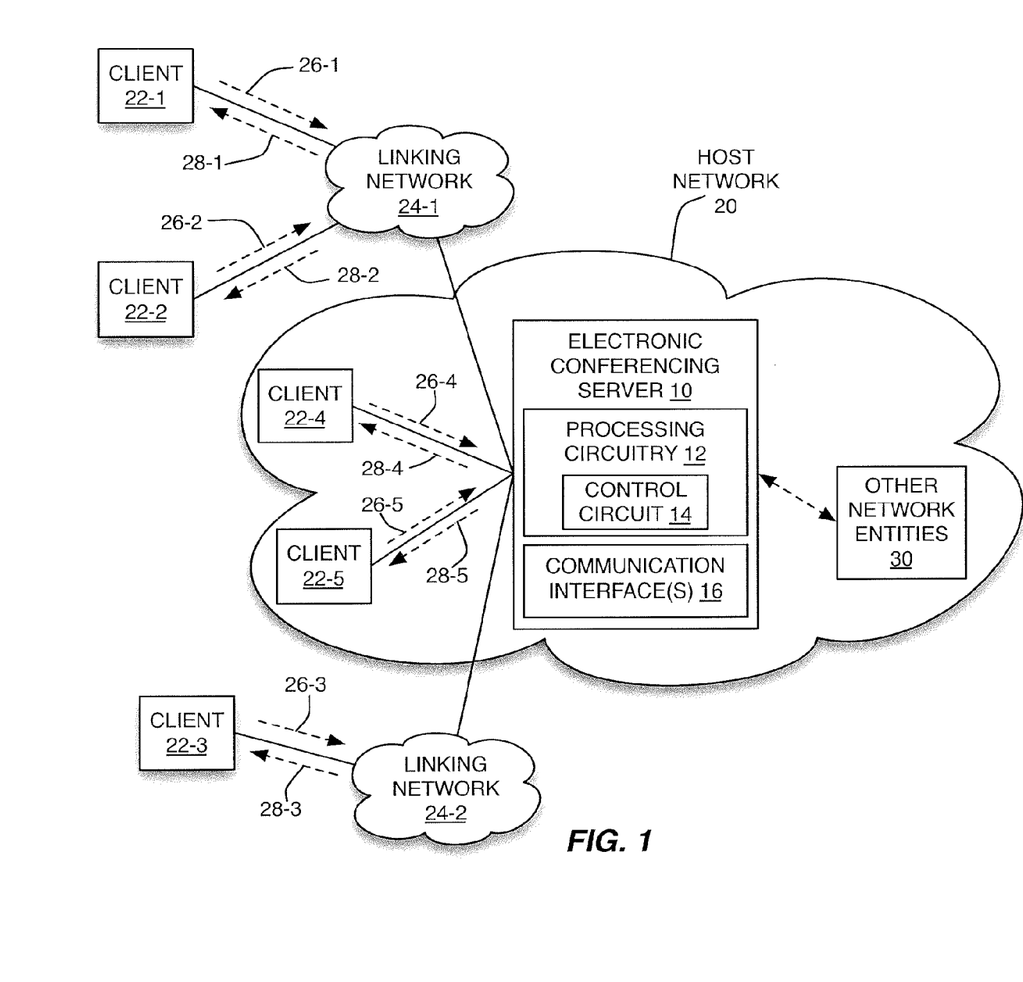
FIG. 1 is a block diagram of one embodiment of an electronic conferencing server configured for operation within a host network.

FIG. 1 is a block diagram of an example embodiment of an electronic conferencing server 10. Processing circuitry 12 within the electronic conferencing server 10 (shortened to "server 10" for ease of discussion) includes a control circuit 14 and one or more communication interfaces 16. In one or more embodiments, the server 10 comprises a computer system that is specially adapted to function as an electronic conferencing server via one or more stored computer programs and, possibly, with particular circuitry—such as video processing and multiplexing circuits. In this regard, the processing circuitry 12 may comprise one or more microprocessor-based circuits or other digital processing circuitry that is configured to functionally implement the control circuit 14 based at least in part on the execution of computer program instructions stored in a computer readable medium in or accessible by the server 10.

Regardless of its particular implementation, the server 10 operates in a "host" network 20. As an example, the host network 20 is an IP-based computer network operated by a corporation or other entity. Each electronic conference provided or otherwise managed by the server 10 consumes a certain amount of the overall capacity of the host network 20, although the amount of capacity consumed varies according to a number of factors, such as the type of conference at issue, the number of clients participating in the conference, the capabilities of those clients, etc.

From the figure, one sees an example case where the server 10 is hosting a given electronic conference that involves a number of "clients" 22—e.g., clients 22-1, 22-2, 22-3, 22-4, and 22-5. Note that the reference number "22" is used herein generically to refer to any given client or clients. Numeric suffixes are used to distinguish between specific ones of the clients 22 when such distinction is helpful to understanding.

Each client comprises an electronic device that is capable of and configured for participation in one or more types of electronic conferences, such as web conferences, video conferences, or another type of multimedia conference. For example purposes, client 22-1 and client 22-2 connect to the server 10 through a linking network 24-1, which in turn is communicatively coupled to the host network 20 in which the server 10 resides. The linking network 24-1 is, for example, an external cellular communication network. Client 22-3 connects through another linking network 24-2, which may be an external IP network, such as the Internet at large. Further, clients 22-4 and 22-5 reside within the host network 20 and connect to the server 10 "directly" through the host network 20.

Of course, there may be more or fewer clients 22 involved in any given conference and any number of linking networks 24 may be involved (of varying types). Further, one or more clients 22 may connect through a series of two or more linking networks 24, such as a cellular network that provides backend links to the Internet. Or, there may be no linking networks 24 involved, in which case all clients 22 would be operating directly within the host network 20. Those skilled in the art will therefore appreciate that FIG. 1 illustrates a non-limiting example case and it should be appreciated that the advantages associated with the server 10 are obtained in a wide range of differing use cases.

To appreciate at least some of these advantages, consider that the server 10 is configured to control clients 22 in an electronic conference hosted by the server 10. The communication interfaces 16 are configured to receive source streams 26 through the host network 20 in which the server 10 operates. Each source stream 26 represents "content" that may be shared or otherwise distributed to other, interested clients 22, as part of the electronic conference. That is, the server 10 in general receives a source stream 26 from each client 22 and distributes those source streams 26 as conference streams 28. However, the conference stream 28 provided to any given client 22 depends on the "utilization settings" at that given client 22.

For example, client 22-3 in the illustration may wish to receive the source streams 28-1 and 28-2 from clients 22-1 and 22-2, respectively, but may have no interest in the source streams 28-4 and 28-5 from clients 22-4 and 22-5. A user of the client 22-3—i.e., a conference participant—would use the conferencing application running on the client 22-3 to configure these desired utilization settings for the available source streams 26, and the server 10 recognizes the configured utilization settings for client 22-3 and generates the conference stream 28-3 to include the desired source streams 26-1 and 26-2 and exclude the non-desired source streams 26-4 and 26-5.

It is contemplated herein that one or more of the clients 22 run conferencing software that provides for user-configured utilization settings that are meant to control which source streams 26 are utilized by the client 22, and that the server 10 is configured to generate the conference streams 28 in compliance with the configuration settings in force at each client 22. Here, the "configuration settings" will be understood to control, among other things, the particular source stream utilizations at the client 22. In turn, the "source stream utilizations" at each client 22 will be understood to be, in an example embodiment, indications of which source streams 26 are selected for use by the client 22, and indications of how each selected source stream 26 is or will be used by the client 22.

In fact, the server 10 as contemplated herein is configured to make clever media prioritizations based on the clients' source stream utilizations. That is, with reference to FIG. 2, the sever 10 advantageously manages the aggregate capacity 32 consumed by each electronic conference hosted by it. Here, the aggregate capacity 32 may be measured according to any one or more network capacity metrics, such as overall bandwidth or data throughput capacity. However measured, it will be appreciated that the host network 20 has finite data carrying capacity and that an electronic conference hosted by the server 10 operating within the host network 20 will consume a potentially significant portion of host network capacity. The actual aggregate capacity 32 that is consumed will depend on the type of conference, the number of participants, the bit rates of the source streams 26 and the bit rates of the conference streams 28.

Figures 2, 3, 4:
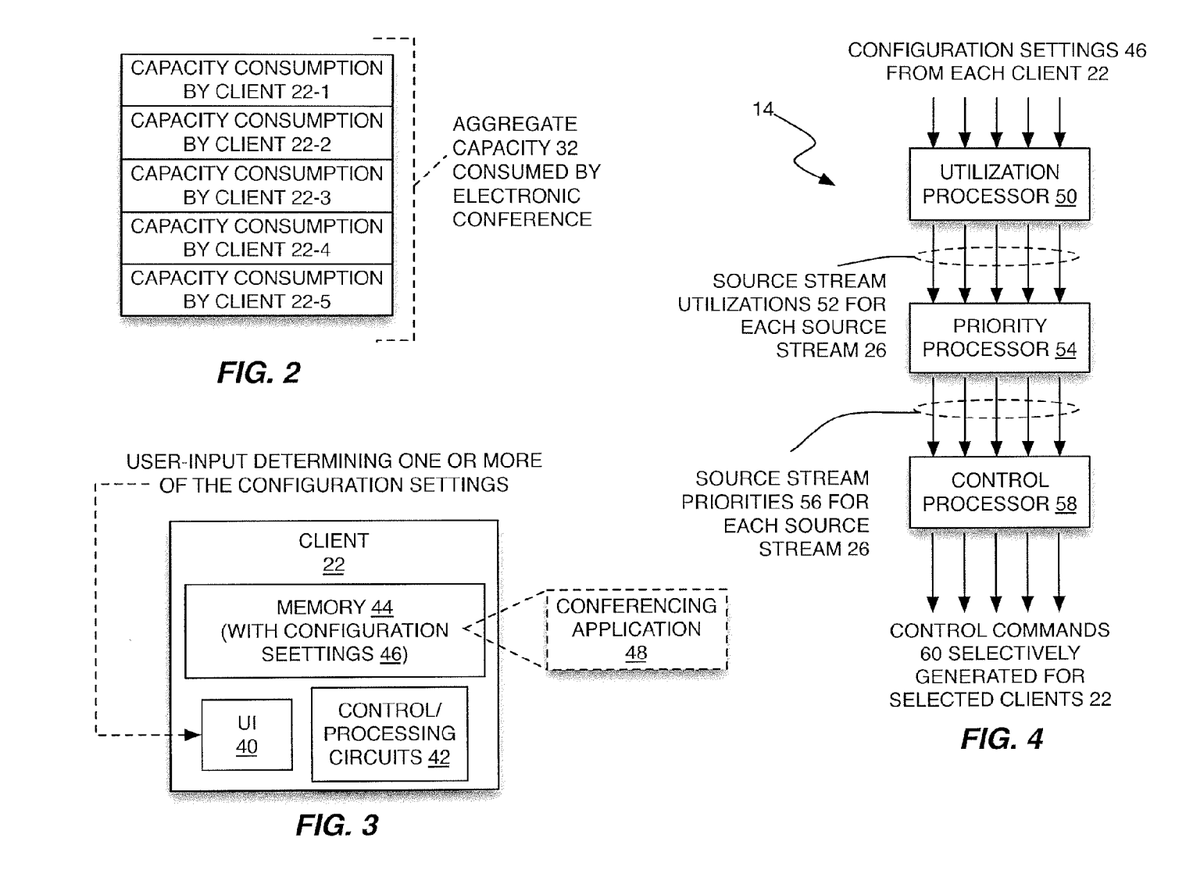
FIG. 2 is a diagram illustrating typical contributions of individual clients participating in a conference to the overall amount of host network capacity consumed by a conference hosted by an electronic conferencing server operating with a host network.
FIG. 3 is a diagram of a client that is configured to provide certain configuration settings information to an electronic conferencing server, which information indicating which conference source streams are used by the client and the manner of such usage.
FIG. 4 is a block diagram illustrating an example configuration for processing circuits in an electronic conferencing server, for determining source stream utilizations and corresponding source stream priorities, and for commanding bandwidth reductions in view of those utilizations and priorities.

As noted, the conference stream 28 distributed by the server 10 to a given client 22 comports with the configuration settings at the client 22, which indicate to the server 10 which ones of the source streams 26 available in the conference are of interest to the client 22, and further how the client 22 will "use" each source stream 26 that is of interest. For example, one source stream 26 may be of primary interest to the user of a given client 22, while one or more other source streams 26 may be of secondary interest. Consequently, the server 10 may form the conference stream 28 sent to the client as including a high-fidelity version of the "primary" source stream 26 and lower-fidelity versions of the "secondary" source streams 26.

Of course, the server 10 also may simply route or otherwise forward the source streams 26 as they are received from the respective clients 22—that is, the server 10 in at least one embodiment does not modify the qualities of the source streams 26 and instead uses them directly in forming the conference streams 28. However, in response to recognizing that a given source stream 26 is being originated in a quality higher than that needed or desired by any of the clients 22 that have selected that source stream 26 for inclusion in their respective conference streams, the server 10 may command the originating client 22 to lower the source stream quality. As detailed herein, the server 10 may predicate its sending of such commands on whether the host network 20 is experiencing congestion.

Regardless, FIG. 3 illustrates an example embodiment of a given client 22. One sees a user interface ("UI") 40, control and processing circuits 42, and memory 44. A user of the client 22 provides inputs through the UI 40, which define or select configuration settings 46. It will be understood that the control and processing circuits 42 will vary in terms of the structure and implementation according to the nature of the client 22—e.g., whether the client is a mobile phone or a PC, or some other type of electronic device capable of running a suitable conferencing application 48.

In at least one embodiment, the control and processing circuits comprise one or more microprocessor-based circuits or other digital processing circuits that are specially adapted for conferencing based on their execution of stored computer program instructions held in the memory 46, where that stored computer program embodies the conferencing application 48. For purposes of this discussion, then, the client 22 can be understood as an electronic device that enables its user to participate in an electronic conference hosted by the server 10 and further enables its user to make configuration settings 46 that indicate to the server 10 which source streams 26 available within the conference are of interest to the client 22 and how such streams will be utilized by the client 22.

These configuration settings 46 may be stored in the memory 44 for transfer to the server 10. As a notable example, the conferencing application 48 running on the client 22 generally provides the user of the client 22 with the option of dynamically changing or adjusting the configuration settings 46 during the conference. Correspondingly, these changes are sent to the server 10, either as they occur or in response to periodic polling by the server 10, so that the server 10 can dynamically reconfigure the conference streams 28 as needed to reflect the source stream utilization changes at each client 22.

More particularly, in at least one embodiment, the server 10 receives changed configuration settings 46 during the course of the conference and uses those changes to recalculate the source stream utilizations 52 and corresponding relative priorities 56. However, it does not necessarily command any of the clients 22 to stop sending their respective source streams 26, or to reduce their respective source stream bandwidths, unless the server 10 detects a congestion condition in the host network 20. In this regard, it will be understood that the server 10 dynamically maintains source stream utilizations 52 and relative priorities 56, to reflect changes in configuration settings 46 at the various clients 22 during the conference.

FIG. 4 illustrates corresponding example processing at the server 10. In this embodiment, the server 10 is configured to control clients 22 in an electronic conference hosted by the server 10. As noted, the server 10 comprises one or more communication interfaces 16 configured to receive source streams 26 through the host network 20 in which the server 10 operates. Each source stream 26 originates from a respective one among the plurality of clients 22 participating in the conference.

Further, as noted, the control circuit 14 is operatively associated with one or more communication interfaces 16. The control circuit 14 at least functionally includes a utilization processor 50 that is configured to determine a source stream utilization 52 within the conference for each source stream 26, based on collecting configuration settings 46 from each client 22. The configuration settings 46 from any given client 22 indicate which source streams 26 are selected for utilization at that client 22. Thus, for a given source stream 26, the source stream utilization 52 is an overall or aggregate usage of the source stream 26 within the conference. As a non-limiting example, the source stream utilization 52 for a given source stream 26 comprises data indicating the number of clients 22 that have selected the source stream 26. The source stream utilization 52 may further comprise data indicating how the source stream 26 is being utilized by one or more of the clients 26 that have selected it—e.g., whether any one or more of the clients 22 have selected it for higher-priority/higher-quality usage, or whether all such clients have selected the source stream 26 for lower-priority/lower-quality usage.

The control circuit 14 further at least functionally includes a priority processor 54 that is configured to prioritize the source streams 26 according to their respective source stream utilizations 52 to determine relative priorities 56 of the source streams 26. Here, the relative priorities 56 are, in one example embodiment, numeric or other rankings that indicate how important any given source stream 26 is within the context of the conference. As an example, a source stream 26 that is selected for use at a number of clients 22 and/or is selected for high-priority/high-quality use at any one or more of the clients 22 is assigned a higher priority than another source stream 26 that is not selected by any clients 22, or is selected by only one or a few clients 22 for low-priority/low-quality utilization.

As a simple example, the relative priorities comprise a set of numeric rankings from 0 to 10, with 10 being the highest priority. For this example, the utilization processor 50 determines the source stream utilization 52 for each source stream 26 from the overall sets of configuration settings 46 of all clients 22 participating in the conference. Then, based on the determined source stream utilization 52 for each source stream 26, the priority processor 54 assigns a priority ranking from 1 to 10 to each source stream 26, to indicate the relative priority of the source stream 26 within the conference. In other embodiments, continuous-valued priority rankings are used, to define relative priorities on a defined, continuous-valued scale.

Still further, the control circuit 14 at least functionally includes a control processor 58 that is configured to selectively reduce the amount 32 of host network capacity consumed by the electronic conference, by selecting one or more clients 22 that are originating lower-priority source streams 26, as determined from the relative priorities 56, and directing the selected clients 22 to stop sending their respective source streams 26, or to reduce a bandwidth of their respective source streams 26. For example, the control processor 58 determines from the source stream priorities 56 that one or more source streams 26 have a "zero" priority, which in an example meaning indicates that the source stream 26 from a given client 22 is not being utilized by another client 22. Such a source stream 26 consumes bandwidth within the host network 20 for no good reason and the server 10 can therefore reduce the amount 32 of host network capacity consumed by the conference by directing any clients 22 that are originating zero priority source streams 26 to stop sending their source streams 26.

Similarly, the control processor 58 determines from the source stream priorities 56 that one or more clients 22 are originating source streams 26 that are of very low priority— here, "very low" is a relative term that indicates the importance of these source stream(s) 26 within the context of the conference. Responsive to that determination, the control processor 58 directs the clients 22 originating low-priority source streams 26 to lower the bit rate rates of their source streams 26, or to otherwise change the format or quality settings of their source streams 26, to lower the bandwidths of those source streams 26.

In at least one embodiment, the imposition of source stream bandwidth reductions is proportional to the relative priority scheme embodied in the relative priorities 56. For example, in at least one embodiment, the server 10 classifies the source streams 26 using a continuous scale—i.e., the relative priority 56 computed for a given source stream 26 is a continuous value computed according to a defined priority scale that ranges from a first value corresponding to zero or very low priority to a second value corresponding to a highest defined priority. Thus, to the extent that source stream bandwidth reductions can be so commanded, the server 10 commands source stream bandwidth reductions in proportion (or inverse proportion, depending on the scale definition) to the relative priorities on the continuous scale.

Here, it will be appreciated that the server 10 in one or more embodiments implements conferencing protocols for communicating with the clients 22, where such protocols allow for adjusting source stream quality up or down. Further, it will be appreciated that certain types of clients 22 may have greater ranges of source stream quality adjustments, and that there may be minimum and maximum source stream qualities that define the range of bandwidth adjustments that can be made under direction of the server 10. Regardless, the server 10 generates control commands 60 for selected clients 22, to control the bandwidth requirements of the respective source streams 26 from those clients 22 and/or to command one or more of those clients 22 to at least temporarily stop sending their respective source streams 26.

In this manner, one sees that the server 10 advantageously reduces the amount 32 of host network capacity consumed by the conference, by acting on those source streams 26 that are of least importance within the conference. As a particular point of this advantageous control, it will be appreciated that the server 10 makes an intelligent assessment of the relative importance of the sources streams 26 based on evaluating and understanding the configuration settings 46 that have been set at each client 22. This assessment enables the control processor 14 to select those clients 22 that are originating low-priority source streams 26, so that the server 10 achieves reduction in the amount 32 of host network capacity consumed by the conference by exclusively or at least initially acting on the low-priority source streams 26.

In at least one embodiment, the server 10 is configured to direct the selected clients 22 to stop sending their respective source streams 26, or to reduce the bandwidth of their respective source streams 26, by sending control signaling to the selected clients 22 via the one or more communication interfaces 16. In particular, the control signaling comprises control commands 60, which are sent according to an electronic conferencing protocol used by the server 10 and said clients 22.

In at least one embodiment, the server 10 is configured to selectively reduce the amount 32 of host network capacity consumed by the electronic conference based on being configured to detect a congestion condition in the host network 20 and reduce the amount 32 of host network capacity consumed by the conference responsive to the detection of the congestion condition. In this regard, the server 10 is configured to detect congestion using its own processing circuitry, or is configured to detect congestion based on receiving a congestion signal from another network entity 30 (as shown in FIG. 1), where the other network entity 30 is configured to monitor loading in the host network 20 and throw a congestion detection signal responsive to detecting network congestion.

In at least one embodiment, the server 10 is configured to determine the source stream utilizations 52 for each source stream 26 based on being configured to determine from the collected configuration settings 46 the number of clients 22 at which the source stream 26 is selected for utilization and is configured to prioritize the source streams 26 based on being configured to assign a higher or lower priority value to each source stream 26 in dependence on the number of clients 22 at which the source stream 26 is selected for utilization. In at least one such embodiment, the configuration settings 46 indicate, for each client, utilization quality settings at the client 22 for utilizing the source streams 26 that are selected at the client 22.

Correspondingly the server 10 is configured to prioritize the source streams 26 based on being further configured to, for each source stream 26, assign a higher or lower priority to the source stream 26 in dependence on the utilization quality settings associated with the source stream 26 at one or more of the clients 22 at which the source stream 26 is selected. These higher and lower priority assignments are reflected in the source stream priorities 56, which are evaluated by the control processor 58. Thus, in at least one embodiment, the server 10 is configured to prioritize the source streams 26 based on being configured to determine a priority rank or category for each source stream 26 according to the respective source stream utilizations 52, so that source streams 26 having lower source stream utilizations 52 are designated as the lower-priority source streams.

Also, as noted, the configuration settings 46 that are used to determine the source stream utilizations 52 are based on one or more user-settable configurations, which are subject to being changed by the users operating the clients 22. In particular, in at least one embodiment, the configuration 46 settings collected from each client 22 include one or more user-selected settings that determine the source stream utilizations 52, and the server 10 is configured to dynamically collect the configuration settings 46 from the clients 22 during the conference, to detect changes in the configuration settings 46. Further, the server 10 is configured to, as needed during the conference in response to changes in the configuration settings 46, determine the source stream utilizations 52 and prioritize the source streams 26 accordingly. That is, the server 10 dynamically updates its determination of the source stream utilizations 52 and corresponding source stream priorities 56 in response to user-driven changes in the configuration settings 46 at any one or more of the clients 22.

Broadly, then, it will be understood that the server 10, as contemplated herein, is configured to prioritize the source streams 26 based on being configured to assign a higher or lower priority value to each source stream 26 in dependence on determining from the collected configuration settings 46 whether the source stream 26 has a higher or lower source stream utilization 52 within the conference. In more detail, it will be understood that in one or more embodiments, the server 10 is configured to prioritize the source streams 26 based on being configured to rank the source streams 26 in order of priority according to their respective priority values—as indicated by the source stream priorities 56. Further, the server 10 is configured to selectively reduce the amount 32 of host network capacity consumed by the conference based on being configured to decide that the amount 32 of host network capacity consumed by the conference should be reduced, and to correspondingly direct one or more clients 22 originating source streams 26 ranked as being lower in priority to reduce their respective source streams bandwidths, or to stop sending their respective source streams 26.

In at least one such embodiment, directing a client 22 to reduce the bandwidth of its source stream 26 comprises directing the client 22 to reduce a quality of its source stream 26. For example, the conference is a video conference and the configuration settings 46 at each client 22 define, for each source stream 26 selected by the client 22, quality or bandwidth requirements at the client 22 for the selected source stream 26.

Figure 5:
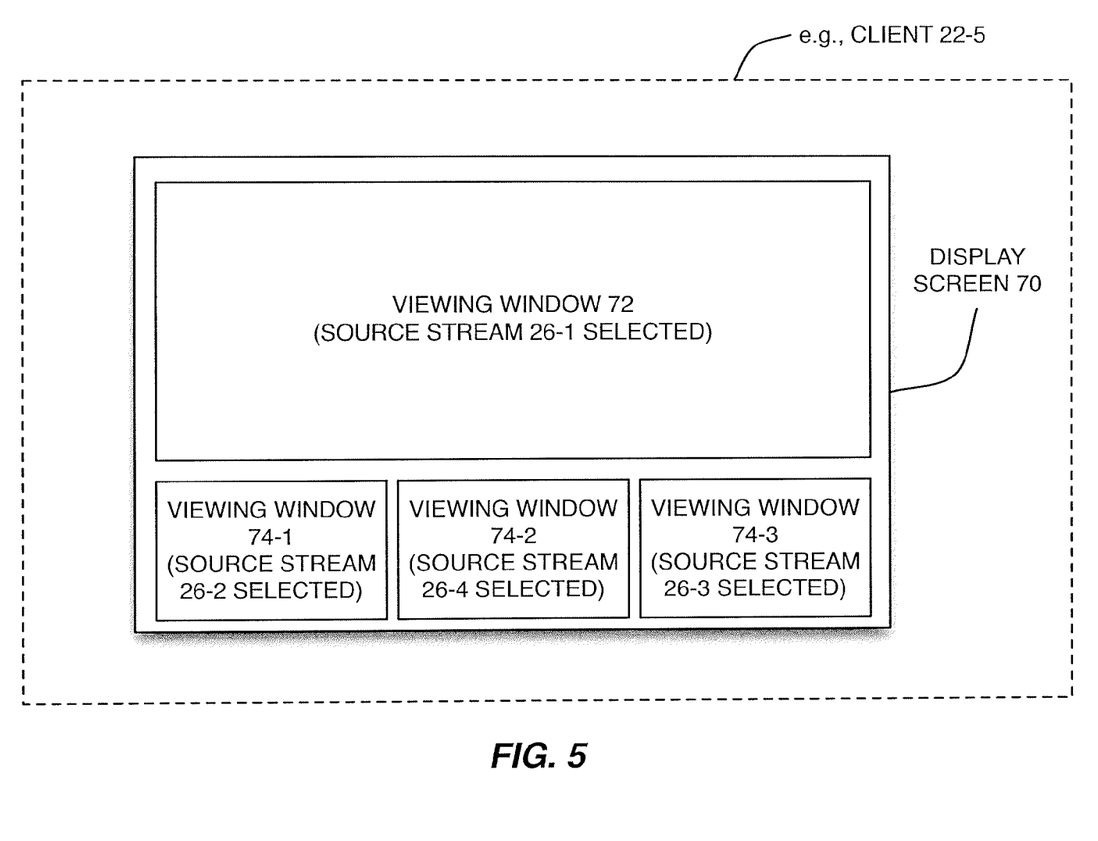
FIGS. 5 and 6 are block diagrams illustrating example video conferencing screen layouts imposed by user-adjusted configuration settings.

See FIG. 5 for an example case. Here, the depicted display screen 70 is provided at the client 22-5 by way of non-limiting example. The remaining clients 22 all may have display screens 70, but it will not necessarily be the case that all such display screens 70 have the same size, resolution, or display capabilities. In any case, the client 22-5 runs a conferencing application 48 such as shown in FIG. 3 that allows the user to select a desired display screen layout. In particular, FIG. 5 depicts a video conferencing screen layout having a primary viewing window 72, and a number of secondary viewing windows 74-1, 74-2, and 74-3. This window layout allows the user of client 22-5 to simultaneously view four source streams 26, but it will be appreciated that higher-resolution video data will be required to provide acceptable video quality in the larger, primary viewing window 72, as compared to the smaller, secondary viewing windows 74. Of course, it will be appreciated that more than two video resolutions may be defined and that the configuration settings 46 generally will reflect any number of settings relating to the quality, resolution, formatting, or other selections made at the client 22 for viewing or otherwise using the source streams 26 that are of interest to the user of the client 22.

Continuing the example of FIG. 5, the configuration settings 46 collected from the client 22-5 will indicate which source streams 26 are selected for viewing at the client, and will further indicate which source stream 26 is selected for display in the primary viewing window 72, and which source streams 26 are selected for display in the secondary viewing windows 74. The server 10 advantageously recognizes from these settings that the source streams 26 selected for secondary window viewing have, at this particular client 22, a more relaxed quality requirement than that of the source stream 26 selected for primary window viewing.

In the illustrated scenario, source stream 26-1 is selected by the user of client 22-5 for primary window viewing and the source streams 26-2, 26-3, and 26-4 are selected for secondary window viewing. From the server's perspective, then, the configuration settings 46 collected from client 22-5 are used to determine that, for client 22-5, the source stream 26-1 has a higher priority than the source streams 26-2, 26-3, and 26-4. Any available conference stream 26 not selected for use by client 22-5 would have a "zero" or minimum priority with respect to the client 22-5.

One therefore sees that by collecting the configuration settings 46 from each of the clients 22 participating in the conference, the server 10 can synthesize or otherwise determine the overall source stream utilizations 52 for each source stream 26. This overall conference utilization determination for each source stream 26 is done by evaluating the configuration settings 46 from each such client 22, to determine which source streams 26 are selected by each client 22, and how each client 22 is or will use the selected source streams 26.

Figure 6:
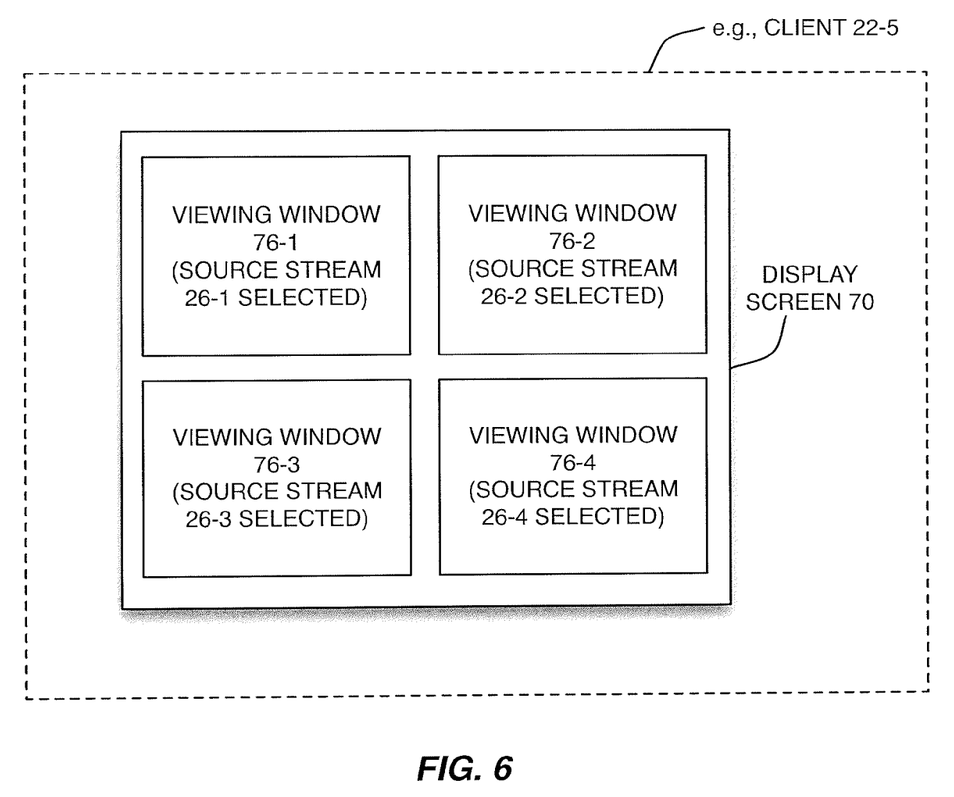

FIG. 6 illustrates another example display screen configuration, which again uses client 22-5 as a non-limiting example. Here, a user of client 22-5 has made configuration setting choices that define the display screen 70 as having four viewing windows 76-1 through 76-4. In this instance, the user has selected all of the source streams 26 available from the other clients 22 participating in the example conference scenario of FIG. 1—i.e., one of the four source streams 26-1 through 26-4 is shown as being assigned to a respective one of the four display windows 76-1 through 76-4. Of course, there may be many more than four clients 22 participating in the conference and this and other examples based on four clients 22 are non-limiting.

Figure 7:
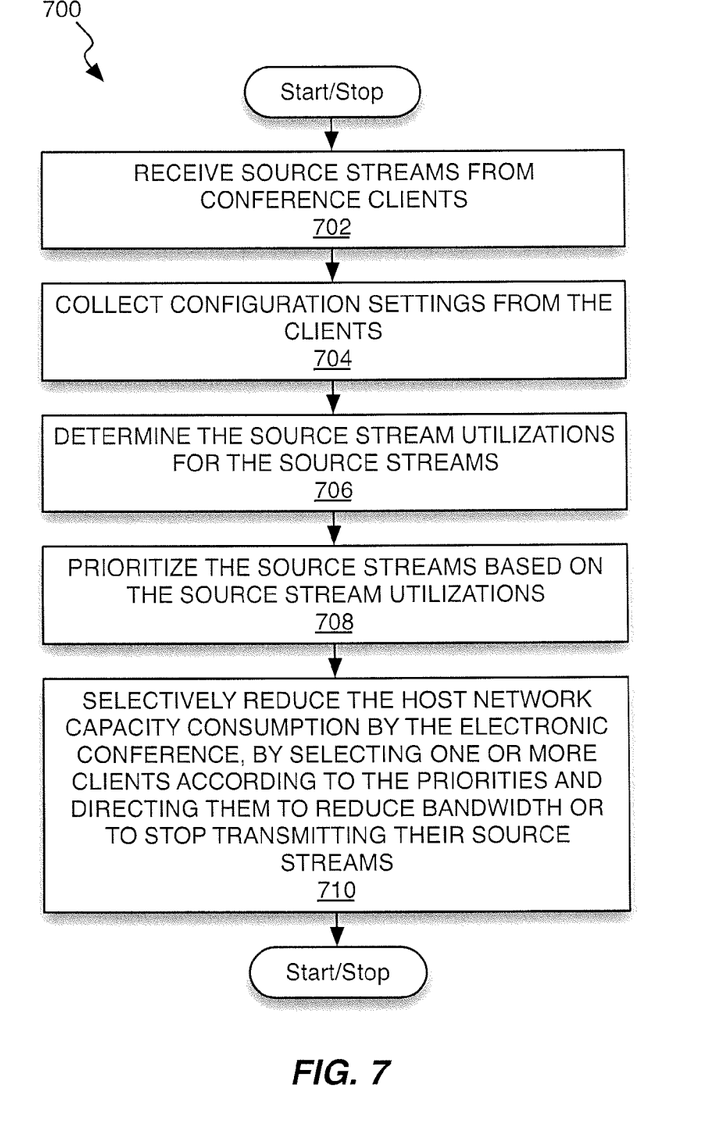
FIG. 7 is a logic flow diagram illustrating one embodiment of a processing method that is implemented by the electronic conferencing server of FIG. 1, for example.

FIG. 7 illustrates a method 700 that better illustrates the broader advantages of the teachings presented herein. The processing of FIG. 7 is for example embodied in one or more computer programs that are stored by and executed by the processing hardware—e.g., computer CPU and associated program/data memory—included in the server 10.

According to the illustrated method 700, processing includes receiving source streams 26 from a number of clients 22 that are participating in a given electronic conference hosted by the server 10, operating with the host network 20 (Block 702). The method 700 further includes collecting configuration settings 46 from clients 22 (Block 704) and determining the source stream utilizations 52 for each source stream 26, as indicated by the collected configuration settings 46 (Block 706).

Still further, the method 700 includes prioritizing the source streams 26 based on the determined source stream utilizations 52 (Block 708) and selectively reducing the host network capacity consumed by the conference (Block 710). Here, "selectively" indicates that the server 10 may be configured to condition or otherwise predicate its capacity reduction operations on one or more triggers. For example, in at least one configuration, the server 10 uses a minimal triggering condition, in that it simply looks for opportunities to reduce the amount 32 of host network capacity consumed by the conference and makes those reductions even if the host network 20 is not experiencing congestion.

In this context, the server 10 "recognizes" the opportunity to reduce the amount 32 of host network capacity consumed by the conference based on detecting that one or more clients 22 are providing source streams 26 of a higher bandwidth than is needed given their respective source stream utilizations 52. As another example, the server 10 in one or more embodiments is configured to recognize from the configuration settings 46 and/or corresponding source stream utilizations 52 that one or more source streams 26 from given clients 22 are not being utilized by any other clients 22. Responsive to such recognition, the server 10 directs those clients 22 that are originating unused source streams 26 to stop sending them. As a corollary operation, the server 10 monitors for changes in the configuration settings 46, looking for indications that one or more clients 22 have selected or have attempted to select any such suspended source stream 26, in which case the server 10 directs the involved client 22 to resume sending its source stream 26.

In another embodiment, the server 10 conditions its capacity reduction operations on detecting congestion in the host network 20. That is, even if there are opportunities to reduce the amount 32 of host network capacity consumed by the conference without penalizing any higher priority source streams 26, the server 10 does not act on any of the lower priority source streams 26 until it detects host network congestion. Of course, other embodiments are contemplated, too. For example, in one contemplated embodiment, the server 10 reduces capacity consumption by stopping zero priority source streams, even in the absence of host network congestion, and then begins lowering the bandwidths of lower-priority source streams 26 responsive to detecting host network congestion. If such actions do not relieve congestion, the server 10 commands more aggressive bandwidth reductions of the lower-priority source streams, and/or begins commanding bandwidth reductions for one or more of the higher-priority source streams 26. It will be understood that in all such actions, the server 10 may be configured to adjust the aggressiveness at which commands source stream bandwidth reductions, so that the highest-priority source streams 26 are least affected, or affected not at all.

As a non-limiting example, the server 10 is a video conferencing server that supports conferences based on one or more defined conferencing protocols and/or client-side conferencing applications, which provide for any number of manual user selections that can be made, all of which potentially influence the configuration settings 46 and the correspondingly determined source stream utilizations 52 and source stream priorities 56. Non-limiting examples include video layout settings, such as full or partial screen video choices, video on/off settings, and still image selection. Further manual selections, like setting a "passive" or "mute" control can also provide meaningful information about how important each source stream 26 is at any given moment during a conference. For example, if a client 22 sets its conference participation setting to "passive," the server 10 can consider that client's source stream 26 to be of minimal priority.

As such, the configuration settings 46 at each client 22 can be understood as providing data from which the server 10 determines how each source stream 26 is used by the clients 22 in the conference—i.e., the source stream utilizations 52 determined for each source stream 26. Further, it will be understood that these source stream utilizations 52 provide a mechanism for the server 10 to determine and assign "weights" to the source streams 26—i.e., the source stream priorities 56 may be expressed as numeric weighting values. The server 10 then chooses which source streams 26 to penalize and/or by how much a given source stream 26 should be penalized to bring about a reduction in capacity consumption, based on the stream weights.

Again, the nature of stream usage may differ depending upon the nature of the conference involved. However, it will be appreciated that many types of configuration settings may be used, such as which source stream 26 has the "focus" at one or more given clients 22. Such indications are particularly useful in web conferencing, where one user may be sharing his or her "desktop" with a number of other users, and where the particular desktop being shared changes during the conference.

Further, for "web chats" where a number of users are contributing audio and/or video streams, the server 10 may key its actions on "active speaker" indications for the various participating clients 22 and/or on the "presence" indications provided by such clients 22. Indeed, "active speaker" indications may be used by the server 10 within the video conferencing context, to set relative priorities 56 of the source streams 26. More broadly, such presence indications represent one example of "configuration" settings that may be automatically generated, e.g., as a function of the client 22 and/or conferencing software application 48. Thus, the configuration settings 46 considered by the server 10 in one embodiment comprise "manual" (user-selected) settings, while in one or more other embodiments they additionally or alternatively comprise automatically generated settings or indications.

Still further, it will be appreciated that a given client 22 may provide conference participation to more than one user—imagine a conferencing PC sitting in a conference room. On the other hand, some clients 22 may by their nature be associated with only one user—imagine a cellphone, for example. Thus, another item of information that may be included in the configuration settings 46 and considered by the server 10 in determining the source stream utilizations 52 is the number of users being served by given ones of the clients 26. In at least one embodiment, the server 10 is configured to incorporate such information as is included in the configuration settings 46 received for each client 22, or is otherwise obtained by or provided to the server 10 as part of the overall conference information, and the server 10 is configured to incorporate such information into its computation of relative priorities 56.

For example, a given client 22 may have a larger screen and/or better audio equipment, meaning that potentially it can make better use of the source streams 26 that it selects, as compared to other lesser-equipped clients 22. The server 10 in at least one embodiment incorporates such considerations into its computation of weights or other values representing the relative priorities 56. As an example, assuming all other considerations are equal, a source stream 26 selected for use by a highly capable client 22 (e.g., a dedicated conferencing system) would be assigned higher priority than a source stream 26 selected for use by a less capable client 22 (e.g., a cell phone running a minimal conferencing application).

Broadly, the teachings herein contemplate using a potentially wide range of "telepresence" attributes that can affect media priorities in different ways. One example is properties of a 3D object and its surrounding context. Depending on what type of attributes the conference participants are interested in and capable of viewing or otherwise using, the server 10 can decide what data should be output in the conference streams 28 it provides and/or can decide the quality settings or other modifications that should be applied to that data.

Overall, the server 10 can be understood as "maximizing" the conferencing experience given the available network capacity in relation to the communication modalities and collaboration objects that are used by the conference participants. That is, the server 10 can be understood as optimizing conference quality in relation to the needs of each client 22 and the host network bandwidth that is available. By giving priority to the source streams 26 that have the highest utilization within the conference, the majority of the conference participants are affected as little as possible even when bandwidth reduction measures are undertaken by the server 10.

Of course, in so doing, the server 10 and its associated method(s) are not limited to the foregoing example embodiments. More generally, the present invention as illustrated by way of example in the foregoing discussion may be carried out in other ways than those specifically set forth herein without departing from essential characteristics of the invention. Thus, the example embodiments are to be considered in all respects as illustrative and not restrictive, and all changes coming within the meaning and equivalency range of the appended claims are intended to be embraced within the present invention.

What is claimed is:

1. A method of controlling clients in an electronic conference, the method comprising:

receiving source streams at an electronic conferencing server hosting the electronic conference in a host network, each the source stream originating from a respective one among a plurality of clients participating in the electronic conference;

determining a source stream utilization within the electronic conference for each source stream, based on collecting configuration settings from each client that indicate which source streams are selected for utilization at the client;

prioritizing the source streams according to their respective source stream utilizations to determine relative priorities of the source streams;

selectively reducing an amount of host network capacity consumed by the electronic conference by:

selecting one or more clients that are originating lower-priority source streams, as determined based on the relative priorities; and directing the selected clients to stop sending their respective source streams, or to reduce a bandwidth of their respective source streams.

2. The method of claim 1, wherein the selectively reducing comprises:

detecting a congestion condition in the host network; and reducing the amount of host network capacity consumed by the electronic conference responsive to the detecting.

3. The method of claim 1:

wherein the determining the source stream utilizations comprises, for each source stream, determining a number of clients at which the source stream is selected for utilization based on the collected configuration settings;

wherein the prioritizing the source streams comprises assigning a higher or lower priority value to each source stream depending on the number of clients at which the source stream is selected for utilization.

4. The method of claim 3:

wherein the configuration settings indicate, for each client, utilization quality settings at the client for the selected source streams;

wherein the prioritizing the source streams comprises, for each source stream, assigning a higher or lower priority to the source stream depending on the utilization quality settings associated with the source stream at one or more of the clients at which the source stream is selected.

5. The method of claim 4:

wherein the electronic conference is a video conference;

wherein the utilization quality settings at each client define, for each source stream selected by the client, quality or bandwidth requirements at the client for the selected source stream.

6. The method of claim 1, wherein the prioritizing the source streams comprises determining a priority rank or category for each source stream according to the respective source stream utilization, so that source streams having lower source stream utilizations are designated as the lower-priority source streams.

7. The method of claim 1:

wherein the configuration settings collected from each client include one or more user-selected settings bearing on the source stream utilizations;

further comprising dynamically collecting the configuration settings from the clients during the electronic conference to detect changes in the configuration settings further comprising repeating the determining the source stream utilizations and the prioritizing the source streams, as needed, responsive to changes in the configuration settings.

8. The method of claim 1, wherein the prioritizing comprises assigning a higher or lower priority value to each source stream depending on whether the source stream has a higher or lower source stream utilization within the electronic conference, as determined from the configuration settings.

9. The method of claim 8:
wherein the prioritizing comprises ranking the source streams in order of priority according to their respective priority values;
wherein the selectively reducing the amount of host network capacity consumed by the electronic conference comprises deciding, at the electronic conferencing server, to reduce the network capacity consumed in the host network by the electronic conference and correspondingly directing one or more clients originating source streams ranked as being lower in priority to reduce their respective source stream bandwidths, or to stop sending their respective source streams.

10. The method of claim 1, wherein the directing the selected clients to reduce the bandwidth of their respective source streams includes directing the selected clients to reduce a quality of their respective source streams.

11. An electronic conferencing server configured to control clients in an electronic conference hosted by the electronic conferencing server, the electronic conferencing server comprising:
one or more communication interfaces configured to receive source streams through a host network in which the electronic conferencing server operates, each the source stream originating from a respective one among a plurality of clients participating in the electronic conference;
a control circuit operatively associated with the one or more communication interfaces and configured to:
determine a source stream utilization within the electronic conference for each source stream, based on collecting configuration settings from each client that indicate which source streams are selected for utilization at the client;
prioritize the source streams according to their respective source stream utilizations to determine relative priorities of the source streams; and
selectively reduce an amount of host network capacity consumed by the electronic conference by:
selecting one or more clients that are originating lower-priority source streams, as determined based on the relative priorities;
directing the selected clients to stop sending their respective source streams, or to reduce a bandwidth of their respective source streams.

12. The electronic conferencing server of claim 11, wherein the control circuit comprises a number of computer processing circuits, including:
a utilization processor configured to determine the source stream utilizations;
a priority processor configured to prioritize the source streams; and
a control processor configured to selectively reduce the amount of host network capacity.

13. The electronic conferencing server of claim 12, wherein the control processor is configured to direct the selected clients to stop sending their respective source streams, or to reduce the bandwidth of their respective source streams, by sending control signaling to the selected clients via the one or more communication interfaces and according to an electronic conferencing protocol used by the electronic conferencing server and the clients.

14. The electronic conferencing server of claim 11, wherein the electronic conferencing server is configured to detect a congestion condition in the host network and reduce the amount of host network capacity consumed by the electronic conference responsive to the detection of the congestion condition.

15. The electronic conferencing server of claim 11, wherein the electronic conferencing server is configured to:
determine the source stream utilizations for each source stream by determining, from the collected configuration settings, a number of clients at which the source stream is selected for utilization;
prioritize the source streams by assigning a higher or lower priority value to each source stream depending on the number of clients at which the source stream is selected for utilization.

16. The electronic conferencing server of claim 15:
wherein the configuration settings indicate, for each client, utilization quality settings at the client for utilizing the source streams that are selected at the client;
wherein the electronic conferencing server is configured to prioritize the source streams by, for each source stream, assigning a higher or lower priority to the source stream depending on the utilization quality settings associated with the source stream at one or more of the clients at which the source stream is selected.

17. The electronic conferencing server of claim 11, wherein the electronic conferencing server is configured to prioritize the source streams by determining a priority rank or category for each source stream according to the respective source stream utilization, so that source streams having lower source stream utilizations are designated as the lower-priority source streams.

18. The electronic conferencing server of claim 11:
wherein the configuration settings collected from each client include one or more user-selected settings that determine the source stream utilizations;
wherein the electronic conferencing server is configured to dynamically collect the configuration settings from the clients, during the electronic conference, to detect changes in the configuration settings;
wherein the electronic conferencing server is configured to again determine the source stream utilizations and again prioritize the source streams, as needed, in response to changes in the configuration settings during the electronic conference.

19. The electronic conferencing server of claim 11, wherein the electronic conferencing server is configured to prioritize the source streams by assigning a higher or lower priority value to each source stream depending on whether the source stream has a higher or lower source stream utilization within the electronic conference, as determined from the configuration settings.

20. The electronic conferencing server of claim 19:
wherein the electronic conferencing server is configured to prioritize the source streams by ranking the source streams in order of priority according to their respective priority values;
wherein the electronic conferencing server is configured to selectively reduce the amount of host network capacity consumed by the electronic conference by:
deciding that the amount of host network capacity consumed by the electronic conference should be reduced; and
correspondingly direct one or more clients originating source streams ranked as being lower in priority to reduce their respective source streams bandwidths, or to stop sending their respective source streams.

21. The electronic conferencing server claim 11, wherein electronic conferencing server is configured to direct the selected clients to reduce the bandwidth of their respective source streams by directing the selected clients to reduce a quality of their respective source streams.

22. The electronic conferencing server of claim 11:
wherein the electronic conference is a video conference;
wherein utilization quality settings at each client define, for each source stream selected by the client, quality or bandwidth requirements at the client for the selected source stream.

* * * * *

UNITED STATES PATENT AND TRADEMARK OFFICE
CERTIFICATE OF CORRECTION

PATENT NO.         : 9,167,013 B2                                        Page 1 of 1
APPLICATION NO.    : 14/001911
DATED              : October 20, 2015
INVENTOR(S)        : Nyberg et al.

It is certified that error appears in the above-identified patent and that said Letters Patent is hereby corrected as shown below:

Claims

In Column 17, Line 3, in Claim 21, delete "server claim" and insert -- server of claim --, therefor.

Signed and Sealed this
Twenty-third Day of February, 2016

Michelle K. Lee
*Director of the United States Patent and Trademark Office*